Nov. 9, 1937.  J. H. DOSTERT  2,098,618
MACHINE FOR TREATING SEED GRAIN
Filed July 6, 1936   2 Sheets-Sheet 1
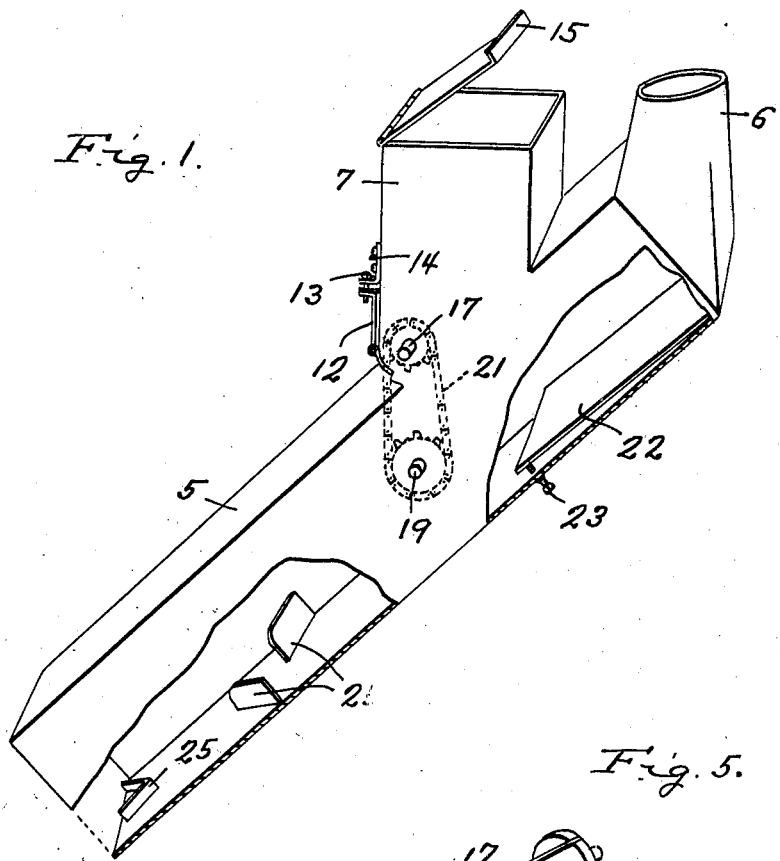
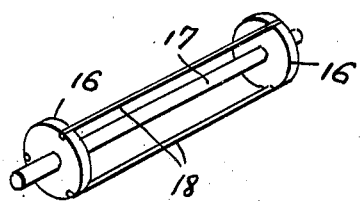
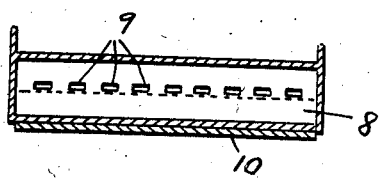
Inventor
J. H. Dostert
By
Attorneys Nov. 9, 1937.  J. H. DOSTERT  2,098,618
MACHINE FOR TREATING SEED GRAIN
Filed July 6, 1936  2 Sheets-Sheet 2

Inventor
J. H. Dostert
By Clarence A. O'Brien
Hyman Berman
Attorneys

Patented Nov. 9, 1937

2,098,618

UNITED STATES PATENT OFFICE 2,098,618

MACHINE FOR TREATING SEED GRAIN

John H. Dostert, Crookston, Minn.

Application July 6, 1936, Serial No. 89,270

3 Claims. (Cl. 221—96)

This invention relates to a machine or means for treating seed grain with a powdered chemical to destroy and prevent fungus growth, such as smut which prevents germination of the seed after it is planted and the invention together with its objects and advantages will be best understood from a study of the following description taken in connection with the accompanying drawings wherein:—

Figure 1 is a side elevational view of the machine with certain parts broken away and shown in section.

Figure 2:
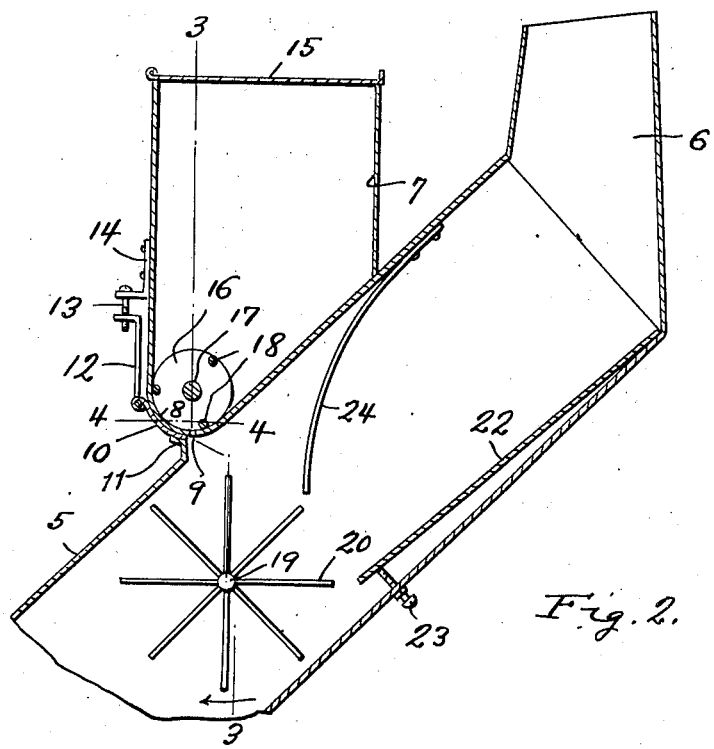
Figure 2 is an enlarged detail sectional view of the upper portion of the machine.
Figure 3:
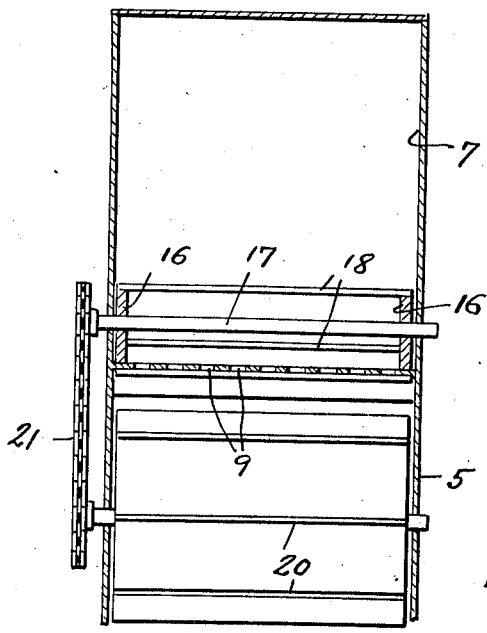

Figures 3 and 4 are detail sectional views taken substantially on the lines 3—3 and 4—4 respectively of Figure 2.

Figure 5 is a perspective view of a reel.

Referring to the drawings by reference numerals it will be seen that the machine comprises an inclined tubular chute 5 which is preferably rectangular in cross-section and is provided at its upper end with an inlet spout 6 through which the seed grain to be treated is poured into the chute 5 to pass therethrough to a suitable receptacle or the like provided at the lower open end of the chute.

Mounted on the top side of the chute 5 adjacent the end 6 thereof, in any suitable manner, preferably by being integral therewith, is a box or receptacle 7 adapted to receive and contain the powdered chemical used in treating the seed grain as it passes through the chute 5.

As shown in Figure 2 the top wall of the chute 5 forms an inclined wall for the bottom of the box or receptacle 7 and said part of the wall of the chute 5 is connected with a vertical wall of the box 7 through the medium of a curved wall section 8 that provides a well in which the powdered chemical tends to accumulate and from which the powdered chemical is forced into the chute 5 through a series of outlet openings 9 formed in the wall section 8 as shown in Figures 2 and 3.

For controlling the amount of chemical passing through the openings 9 there is provided an arcuate valve plate 10 which is slidably supported between the wall section 8 and a suitable formation 11 formed on the top wall of the chute 5 as shown in Figure 2. For adjusting the plate 10 and for securing the plate at the desired adjustment there is hinged to one edge of the plate 10 a bracket 12 that has an angular threaded end engaged with an adjustment screw 13 that is engaged in the apertured angular end of a bracket 14 suitably secured to the wall of the receptacle or box 7.

There is also provided for the top of the box or receptacle 7 a suitable hinge lid 15.

For forcing powdered chemical through the openings 9 and into the chute 5 there is suitably mounted in the bottom of the receptacle or box 7 a reel consisting of a pair of disks 16 suitably secured on a shaft 17 and connected by a series of bars or rods 18 which have wiping engagement with the wall section 8 in a manner to scrape the wall section and force the powdered chemical through the openings 9 as the reel revolves.

Suitably located and mounted within the chute 5 is an agitator reel which consists of a shaft 19 having blades or fins 20 radiating therefrom. The shaft 19 of the agitator reel is in driving engagement with the shaft 17 of the aforementioned feeding reel through the medium of a chain and sprocket connection 21 as best shown in Figures 1 and 3.

Suitably mounted in the bottom of the chute 5 adjacent the end 6 thereof is what may be termed a jumper plate 22. Plate 22 which may be formed of spring metal or other suitable material is anchored at one end where the chute 5 joins with the inlet 6 and the plate 22 is held at the desired adjustment through the medium of an adjusting screw 23 threadedly engaged with the bottom of the chute 5 and having its inner end in suitable contact with the plate 22. When properly adjusted plate 22 will serve to direct the grain against the blades 20 of the agitator reel for revolving the latter and power from the reel 20 is transmitted through the chain and sprocket connection 21 to the feed reel within the receptacle or box 7 for operating the latter.

Also to direct the grain downwardly and against the fins or blades 20 of the agitator reel there is suitably anchored to the top of the chute 5 within the chute a curved baffle plate 24.

As is thought apparent the agitator reel is so positioned as to insure a thorough mixing of the powdered chemical and the grain feed, and to further insure a proper mixing of these elements there is provided in the bottom of the chute 5 between the agitator reel and the outlet end of the chute suitably constructed and arranged baffles 25. (See Figure 1.)

It will be seen that in actual practice as the grain passes through the chute 5 it will impinge against the blades 20 of the agitator reel for revolving the latter and through the medium of the drive connection between the reels the feed reel within the box 7 will be driven simultaneously with the agitator reel. The feed reel will cause the powdered chemical within the box 7 to move towards the openings 9 to pass through the openings into the chute 5 and onto the grain to be thoroughly mixed therewith by the action of the agitator reel and the baffles 25.

It is thought that a clear understanding of the construction, utility and advantages of an invention of this character will be had without a more detailed description.

Having thus described the invention what is claimed as new is:—

1. In a seed treating machine, an inclined tubular chute, a chemical box mounted on the top side of the chute, a partition wall common to the chute and the box and provided with openings for the passage of chemical from the box into the chute, a rotary agitator mounted interiorly of the chute to be rotated by impact of seed grain passing down said chute, a rotary feed wheel mounted in the box in operative position to said openings, and a driving connection between said rotary agitator and said rotary feed wheel, and a regulating valve for said openings to control the passage of chemical from the box to the chute, a jumper plate mounted in the bottom of the chute adjacent the upper end of the latter and means engaged with the plate for securing the same at the desired angle for directing grain passing into the chute against the blades of the rotary agitator.

2. In a seed treating machine, an inclined tubular chute, a chemical box mounted on the top side of the chute and a partition wall common to the chute and the box and provided with openings for the passage of chemical from the box into the chute, a rotary agitator mounted interiorly of the chute in position to receive the discharge from said openings and to be rotated by impact of seed grain passing down said chute, a rotary feed wheel mounted in the box in operative position to said openings, a driving connection between said rotary agitator and said rotary feed wheel, and a regulating valve for said openings to control the passage of chemical from the box to the chute, a jumper plate mounted in the bottom of the chute adjacent the upper end of the latter and means engaged with the plate for securing the same at the desired angle for directing grain passing into the chute against the blades of the rotary agitator, and a baffle plate secured to the top side of the chute at the upper end of the latter and disposed to direct grain downwardly towards and against the blades of the rotary agitator.

3. In a seed treating machine, an inclined tubular chute, a chemical box mounted on the top side of the chute and a partition wall common to the chute and the box and provided with openings for the passage of chemical from the box into the chute, a rotary agitator mounted interiorly of the chute in proximity to said openings, said agitator being rotated by impact of the seed grain passing down said chute, a rotary feed wheel mounted in the box in operative position to said openings, and a driving connection between said rotary agitator and said rotary feed wheel, and a regulating valve for said openings to control the passage of chemical from the box to the chute, a jumper plate mounted in the bottom of the chute adjacent the upper end of the latter and means engaged with the plate for securing the same at the desired angle for directing grain passing into the chute against the blades of the rotary agitator, and a baffle plate secured to the top side of the chute at the upper end of the latter and disposed to direct grain downwardly towards and against the blades of the rotary agitator.

JOHN H. DOSTERT.